United States Patent [19]

Ebert et al.

[11] 4,292,573

[45] Sep. 29, 1981

[54] REVERSIBLE DIRECT CURRENT MOTOR WITH A PERMANENT MAGNET ROTOR AND ELECTRONIC COMMUTATING DEVICE

[75] Inventors: Hermann Ebert; Johann Grüntleitner, both of Nuremberg; Hans Kühnlein, Nürnberg-Grossgründlach, all of Fed. Rep. of Germany

[73] Assignee: Siemens Aktiengesellschaft, Munich, Fed. Rep. of Germany

[21] Appl. No.: 946,106

[22] Filed: Sep. 27, 1978

[30] Foreign Application Priority Data

Sep. 28, 1977 [DE] Fed. Rep. of Germany ....... 2743695

[51] Int. Cl.³ .............................................. H02P 6/02
[52] U.S. Cl. .................................. 318/138; 318/254; 318/439; 318/257
[58] Field of Search ............... 318/138, 254, 257, 288, 318/290, 685, 696, 439

[56] References Cited

U.S. PATENT DOCUMENTS

| | | | |
|---|---|---|---|
| 3,795,850 | 3/1974 | Grygera | 318/257 |
| 3,942,081 | 3/1976 | Liska et al. | 318/138 |
| 4,162,435 | 7/1979 | Wright | 318/138 |

*Primary Examiner*—J. V. Truhe
*Assistant Examiner*—John W. Redman
*Attorney, Agent, or Firm*—Kenyon & Kenyon

[57] ABSTRACT

The polarity of the desired speed voltage of a speed control device and the commutation sequence of the current flowing in the stator windings are reversed for reversing an electronically commutated D.C. motor. A voltage, proportional to the EMF ad obtained from the motor voltage by I×R compensation, is used as the actual speed voltage for the speed control device, the polarity of the voltage proportional to the EMF being reversed when the direction of rotation signal changes.

5 Claims, 2 Drawing Figures

REVERSIBLE DIRECT CURRENT MOTOR WITH A PERMANENT MAGNET ROTOR AND ELECTRONIC COMMUTATING DEVICE

BACKGROUND OF THE INVENTION

This invention relates to a reversible D.C. motor with a permanent magnet rotor and electronic commutating device, in general and more particularly to improved arrangement for controlling, such a motor.

Reversible D.C. motors of this type in which the polarity of the desired speed voltage of a speed control device and the commutating sequence of the commutating transistors which reverse a motor voltage specified by the speed control device applied to the stator windings for reversing the direction of rotation after the delivery of a direction of rotation signal, initiated by the speed control device, to a selection circuit are known.

In motors of this type, the actual speed value cannot be obtained, off hand, from the EMF induced in the stator windings by the permanent magnet rotor. It is known to take this EMF off by means of diodes. However, the EMF coupled out in this manner is proportional only to the absolute amount of the speed value. It is for this reason that the coupling out of the EMF by means of diodes can be applied only within limits.

The direction of rotation of brushless D.C. motors is reversed, not by a reversal of polarity of the supply voltage, but by the reversal of the sequence in which the stator windings are energized. Therefore, regardless of the direction of rotation of the permanent magnet rotor, the direction of the motor current is always the same, thus obtaining an EMF dependent on the direction of rotation is not possible, off hand, in brushless motors reversible in their direction of rotation.

SUMMARY OF THE INVENTION

It is an object of the present invention to permit obtaining, in a D.C. motor of the type described at the outset, in a simple manner, a signal proportional to both direction of rotation and speed. According to the present invention, this problem is solved by obtaining a voltage, proportional to the EMF from the motor voltage by means of I×R compensation and using this voltage as the actual speed voltage and reversing the polarity of the voltage proportional to the EMF when the direction of rotation signal changes.

The actual current value is preferably taken from a current measuring resistor located in the motor circuit, and is supplied, via a resistor, to the input of an actual current value amplifier which is connected, via another resistor, to the junction point of a resistor and a diode, connected in series and carrying the motor voltage, for the compensation of the residual collector emitter voltage of the commutation output stage in the stator windings circuit and of the forward voltage of a diode preceding it.

DETAILED DESCRIPTION OF THE INVENTION

Figure 1:
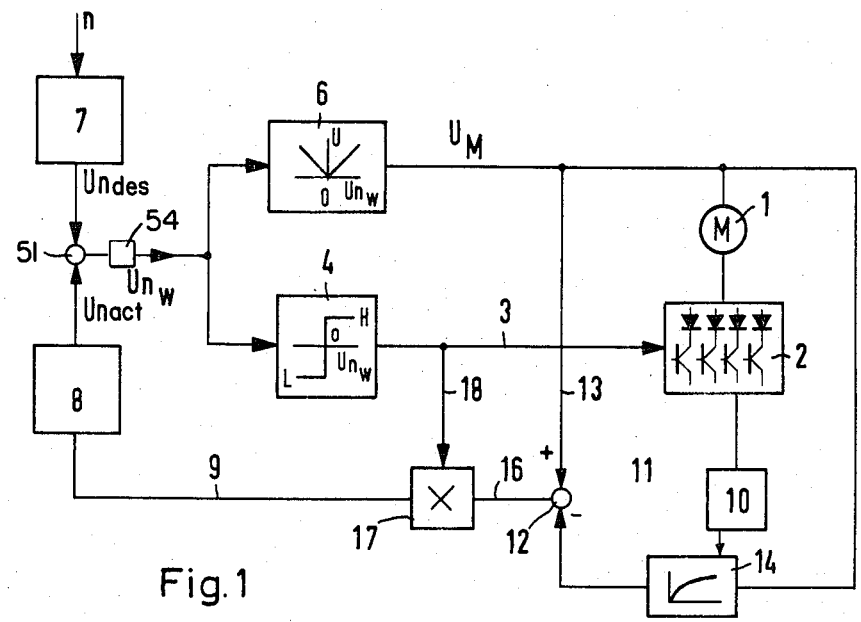
FIG. 1 a block diagram of a speed controlled reversible D.C. motor according to the present invention.

FIG. 1 illustrates a motor 1 which has a permanent magnet rotor and a polyphase stator winding, in the present case four stator windings staggered by 90°, energized via a commutating device 2 as a function of the angular position of the permanent magnet rotor as sensed by means of at least two Hall effect generators disposed on the stator periphery, staggered by 90° el. The commutating device 2 has a signal input 3 which is connected to a signal transmitter 4 through which a direction of rotation signal can be supplied to the commutating device 2. In the event of a change of the direction of rotation signal from "0" to "1" or vice versa, the energizing sequence of the stator windings being energized is reversed so that the permanent magnet rotor changes its direction of rotation. The signal transmitter 4 receives a signal $Un_W$ proportional to both the direction of rotation and the speed deviation from a speed control device 5.

As is evident from box 4, a "0" signal (counterclockwise rotation) is supplied to the electronic commutating device 2 when the output voltage $Un_W$ of the speed control device 5 is negative and an "1" signal (clockwise rotation) when $Un_W$ is positive.

The voltage $Un_W$ of the speed control device 5, being proportional to both the torques and the direction of rotation, is also supplied to a regulator output stage 6 which furnishes a voltage proportional to the magnitude of the torque, regardless of the direction of rotation, i.e., it includes an absolute value circuit. This voltage increases linearly with the torque deviation. Accordingly, the motor voltage $U_M$, which is fed to the motor 1 and to the commutating device 2, appears at the output of the regulator output stage 6.

The speed control device 5 has a summing junction 51 at its input which receives its desired value $Un_{des}$ from a desired value setter 7, into which the desired speed $n_{des}$ is set as a voltage. A voltage $Un_{act}$ proportional to the actual speed, is taken from matching stage 8 which receives a voltage proportional to the EMF on line 9. Speed control device 5 may exhibit an integral behavior as is common for such devices. A current measuring device 10 which may consist of an ohmic resistance, for example, develops a quantity proportional to the actual current. The quantity $I_M \times R$ is fed over a line 11 to an actual current amplifier 14. Also supplied to the actual current amplifier 14 is the motor voltage UM. Actual current amplifier 14 includes means to derive a compensation voltage from the motor voltage UM. The output of the actual current amplifier 14 is fed to a summing junction 12, which may also include an amplifier, which has as a second input the motor voltage UM. At junction 12 the output of the actual current amplifier 14 is subtracted from motor voltage UM. Thus, the output 16 of summing junction 12 is a voltage which is essentially proportional to the absolute amount of the EMF. This voltage is supplied to an inverting/noninverting amplifier 17 which is controlled over a line 18 as a function of the direction of rotation signal transmitter 4 so that it can transmit either the uninverted or inverted voltage proportional to the EMF to the speed control device 5, To start the motor 1, the desired value $n_{des}$ is put into the desired value setter 7. The output Undes drives the regulator output stage 6 fully because Unact equals zero when the permanent magnet rotor is standing still. A "1" signal appears at the output of the signal transmitter 4 and at the input of the commutating device 2. The stator windings are energized in accordance with the rotor position, and the motor starts. While the motor runs, and EMF counter-acting the motor voltage $U_m$ develops which likewise increases with increasing speed. Unless a subordinate current regulator is provided the motor current decreases with increasing EMF. The motor speed increases until the actual speed Un equals the desired speed Undes. The speed deviating Un. then equals zero. As soon as this causes the speed to decrease, the motor voltage $U_M$ is steadily increased again via the speed control device 5.

If the motor speed increases to the point where $Un_{act}$ is greater than $Un_{des}$, i.e., Until $Un_W$ becomes negative, the signal transmitter 4 responds and transmits a signal corresponding to this change in the direction of rotation the commutating device 2 over line 3. This causes a reversal of the commutating sequence of the commutating transistors so that a braking process sets in until $n_{act} = n_{des}$.

To reverse the motor, $n_{des}$ jumps to $-n_{des}$ i.e., the speed deviation $nw = 2 \times ns$. The polarity of the speed deviation Unw reverses so that the signal transmitter 4 transmits a "0" signal to the commutating device 2 over the line 3. This means that a strong braking process sets in immediately. Of course, this braking current is kept within limits by a current regulator, not shown.

Figure 2:
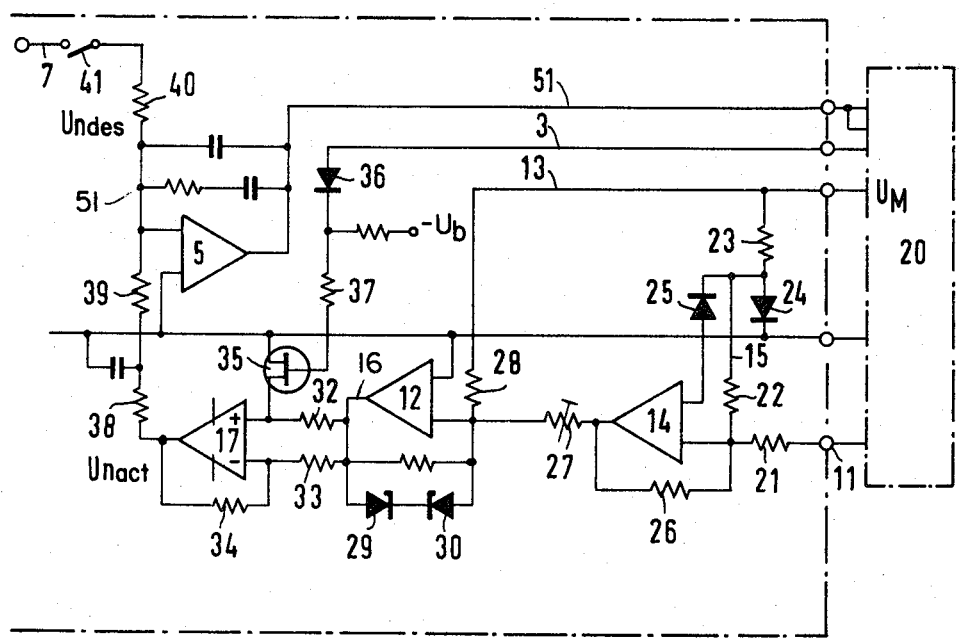
FIG. 2 is a circuit diagram of the speed control device of FIG. 1.

FIG. 2 shows an embodiment for developing an EMF proportional to the speed from the motor UM by $I \times R$ compensation. This circuit is based on the relationship:

$$U_M = E + I_M \times R + U_k + (1/k) \times R \times I_m.$$

In the above, UM is the motor voltage, E the EMF, $I_M \times R$ the ohmic voltage drop in the stator windings, $U_k$ the sum of the residual collector-emitter voltage $U_{CE}$ of the commutation output stage and the forward voltage $U_D$ of a diode preceding it, k a proportionality factor, R the ohmic resistance of the stator winding and $I_M$ the motor current. This results in:

$$E = U_M - U_K - I \times R_W \times (1 + (1/k)).$$

In FIG. 2 the commutating device 2 with the current regulator, the signal transmitter 4 and the regulator output stage 6 according to FIG. 1, are designated by block 20. A quantity proportional to the actual current $I_M \times R$ is supplied to the actual current amplifier 14 over a line 11 and a resistor 21. The input of the amplifier is connected via another resistor 22 to the junction point of another resistor 23 and a diode 24 connected in series. The series arrangement is connected to the line 13 which carries the motor voltage UM. The diode forward voltage UD and the residual collector emitter voltage UCE of the commutation output stage in the motor winding branch are compensated by the diode 24. Another diode 25 acts to limit the voltage.

The output of the actual current amplifier 14 is connected to its inverting input via a feedback resistor 26. The output of the actual current amplifier 14 is connected to one input of a summing amplifier 12 via a variable resistor 27. To this input the motor voltage $U_M = EMF + I_M \times R + U_k + (1/k) \times R \times I_M$ is supplied via a resistor 28. The compensation of $I_M \times R + U_k + (1/k) + R + I_M$ is set by the resistor 27. At the output 16 of the summing amplifier 12 a voltage proportional to the EMF will then appear. The output voltage of the summing amplifier 12 is limited by two Zener diodes 29 and 30. The output 16 of the summing amplifier 12 is connected via two identical resistors 32 and 33 to the inverting and noninverting inputs of the amplifier 17. The inverting input of the amplifier 17 is connected to its output via a resistor 34. The noninverting input of the amplifier 17 is connected to the negative pole of the D.C. voltage source via a field effect transistor 35. It is driven via the line 3 which comes from the signal transmitter 4 according to FIG. 1. A diode 36 and resistors 37 are used to match the signal to the field effect transistor so that it will respond in any case. When the field effect transistor 35 is not conducting, both inputs of the amplifier 17 carry the signal at the output 16 of the summing amplifier 12 so that it also appears, with the same polarity, at the output of the amplifier 17. But when the field effect transistor 35 is turned on via the line 3 by an appropriate direction of rotation signal, zero potential is applied to the non-inverting input of the amplifier 17. When the non-inverting input receives the input signal, the amplifier operates as an inverter, in a manner known per se, i.e., with a positive signal at its input, a negative signal of corresponding magnitude appears at the output of the amplifier 17.

Accordingly, the output of the amplifier 17 carries a voltage Unact which is proportional to the actual speed and is supplied to the input of the speed control device 5 together with the desired value via resistors 38 to 40. The desired speed value undes can be supplied to the speed control device 5 by means of a switch 41 to start the motor.

The direction of rotation signal furnished by the speed control device and transmitted by the signal transmitting arrangement, therefore, is used twice, once to influence the direction of rotation of the motor 1 and the other time, to determine the sign of the voltage proportional to the EMF, computed from the motor current and the motor voltage. It is possible, therefore, to control a brushless D.C. motor, regardless of its internal design, in the same manner as a D.C. motor with brushes.

What is claimed is:

1. In a reversible direct current motor with a permanent magnet rotor and electronic commutating device, in which the polarity of the desired speed voltage of a speed control device and the commutating sequence of the commutating transistors, which apply a motor voltage specified by the speed control device to the stator windings, are reversed for reversing the direction of rotation in response to a change in a direction of rotation signal, initiated by the speed control device, to a selection circuit, the improvement comprising:
    (a) means to sense the motor voltage;
    (b) means to subtract the motor $I \times R$ factor from the sensed motor voltage to develop a voltage proportional to the motor CEMF.
    (c) means of feed said voltage proportional to CEMF to the motor controller; and
    (d) means to reverse the polarity of said voltage proportional to the CEMF in the event of a change of the direction of rotation signal.

2. The improvement according to claim 1 wherein each of the commutating transistors in the electronic device is preceded by a diode and wherein said means to subtract include:
    (a) a first, current measuring resistor located in the motor circuit to measure the actual value of current;
    (b) an actual current amplifier;
    (c) a second resistor supplying said actual value to the input of said amplifier;

(d) a third resistor and a further diode, connected in series across the motor voltage;

(e) a fourth resistor coupling the junction point of said third resistor and further diode to said amplifier for the compensation of the residual collector-emitter voltage of the commutation output stage in the stator windings circuit and the forward voltage of the diode preceding it.

3. The improvement according to claim 2 and further including:

(a) a summing amplifier;

(b) a variable resistor coupling the output of the actual current amplifier to the input of said summing amplifier; and (c) a further resistor coupling the motor voltage to said summing amplifier.

4. The improvement according to claim 2 and further including zener diodes coupled between the output and input of said summing amplifier for limiting the output voltage of said summing amplifier.

5. The improvement according to claim 4 and further including a further amplifier having the output voltage of said summing amplifier as an input and means responsive to the direction of rotation signal to switch said further amplifier from inverting to non-inverting operation to reverse the polarity of its output voltage, whereby reversal from inverting to non-inverting operation for the reversal of the polarity of the output voltage can be accomplished by means of the direction of rotation signal.

* * * * *